United States Patent [19]
Yokonuma et al.

[11] Patent Number: 5,745,214
[45] Date of Patent: Apr. 28, 1998

[54] FILM IMAGE PROCESSING APPARATUS

[75] Inventors: Norikazu Yokonuma, Yokohama; Kazuyuki Kazami, Tokyo; Hideo Hibino, Kawasaki; Hisashi Okutsu, Yokohama, all of Japan

[73] Assignee: Nikon Corporation, Tokyo, Japan

[21] Appl. No.: 668,473

[22] Filed: Jun. 25, 1996

[30] Foreign Application Priority Data

Jun. 26, 1995 [JP] Japan .................... 7-159579

[51] Int. Cl.$^6$ .......................... G03B 27/00; G03B 27/52
[52] U.S. Cl. ........................ 355/18; 355/40; 355/41
[58] Field of Search .................... 355/18, 27, 35, 355/40, 41, 42

[56] References Cited

U.S. PATENT DOCUMENTS

| | | |
|---|---|---|
| 4,482,924 | 11/1984 | Brownstein . |
| 4,485,406 | 11/1984 | Brownstein . |
| 4,506,300 | 3/1985 | Fearnside . |
| 4,974,096 | 11/1990 | Wash ........................ 358/302 |

Primary Examiner—R. L. Moses
Assistant Examiner—Shival Virmani
Attorney, Agent, or Firm—Oliff & Berridge PLC

[57] ABSTRACT

A film image processing apparatus comprises an image pickup device that picks up a photographic image formed on developed film, a screen image signal output device that outputs a screen image signal to display the image that has been picked up on a monitor screen as a screen image, a reading device that reads information related to the photographic image from an information recording area provided on the film, an input device that inputs external information from an external device connected to the film image processing apparatus, a display device that outputs a display signal to display text information related to the photographic image on the monitor screen and a control device that controls the display device so that at least either the read information read by the reading device or the external information input from the external device is displayed on the monitor screen as text information together with a screen image of the photographic image corresponding to the information.

6 Claims, 14 Drawing Sheets

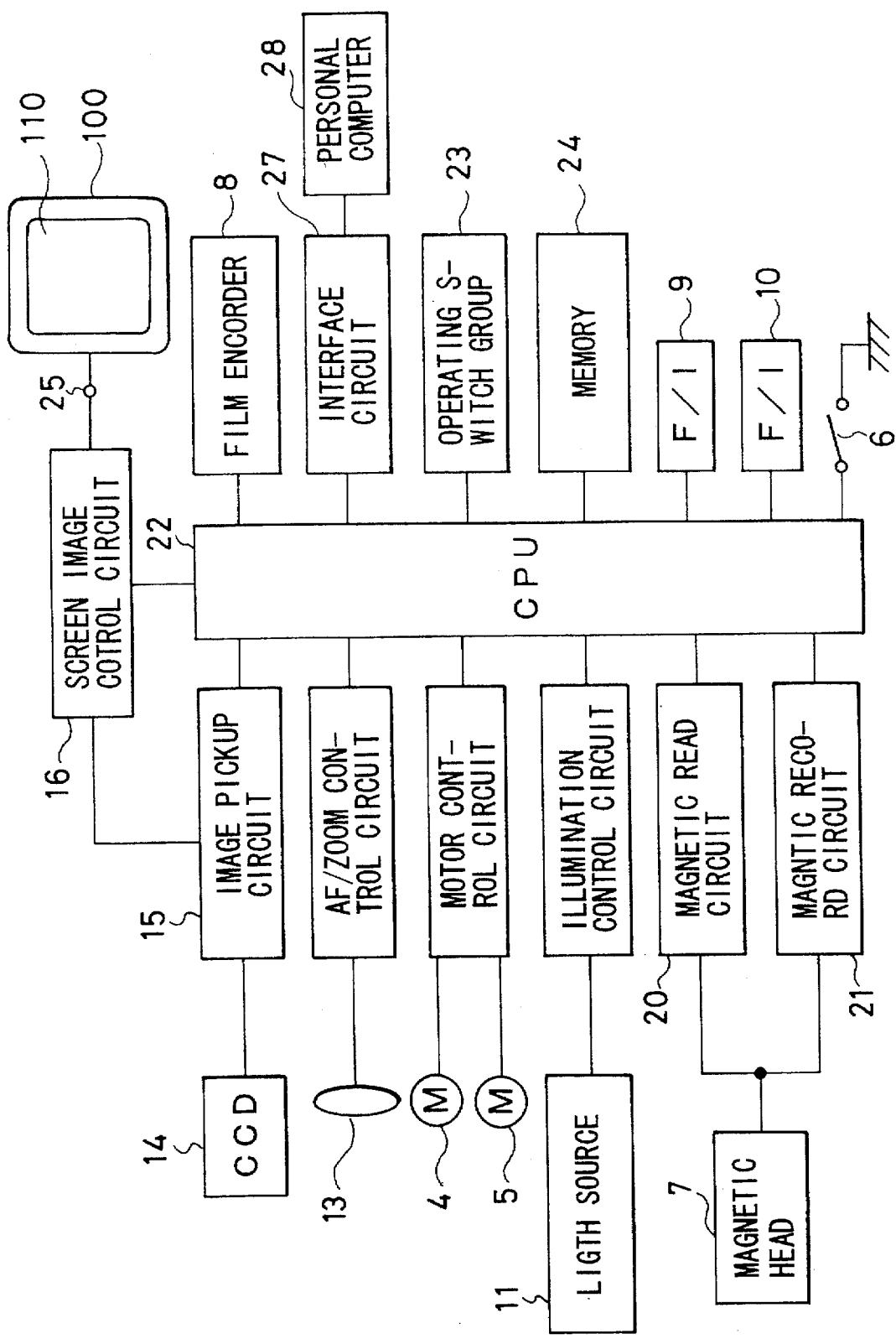

FILM IMAGE PROCESSING APPARATUS

BACKGROUND OF THE INVENTION

1. Field of the Invention

The present invention relates to a film image processing apparatus that is used for viewing photographic images formed on developed film on a monitor screen display.

2. Description of the Related Art

U.S. Pat. Nos. 4,482,924, 4,485,406, and 4,506,300 disclose apparatuses that pick up the images on developed film using a CCD or the like and project the images thus picked up as screen images on a television screen or the like.

In this type of apparatus, it is conceivable to display information related to a photographic image to be displayed in the form of characters on the display. However, apparatuses in the prior art do not have a function for inputting information to be displayed from the outside of the apparatus.

SUMMARY OF THE INVENTION

An object of the present invention is to provide a film image processing apparatus with which it is possible to display information input from the outside on the screen together with the corresponding photographic image.

In order to achieve the object described above, the film image processing apparatus according to the present invention comprises an image pickup device that picks up a photographic image formed on developed film, a screen image signal output device that outputs a screen image signal to display the image thus picked up on a monitor screen as a screen image, a reading device that reads information related to the photographic image from an information recording area provided on the film, an input device that inputs external information from an external device connected to the film image processing apparatus, a display device that outputs a display signal to display text information related to the photographic image on the monitor screen and a control device that controls the display device so that, at least, either the read information read by the reading device or the external information input from the external device is displayed as text information on the monitor screen simultaneously with the screen image of the photographic image corresponding to the information.

According to the present invention, since, at least, either the read information read from the recording area of the film or the external information input from the external device is displayed on the monitor screen along with the screen image of the photographic image, various types of text information can be displayed, thereby enhancing the user's enjoyment of screen image viewing.

BRIEF DESCRIPTION OF THE DRAWINGS

FIG. 1B is a block diagram showing the overall structure of the film image processing apparatus in the embodiment above according to the present invention;

DETAILED DESCRIPTION OF THE PREFERRED EMBODIMENT

An embodiment according to the present invention is explained in reference to FIGS. 1A-12E.

Figure 1A:
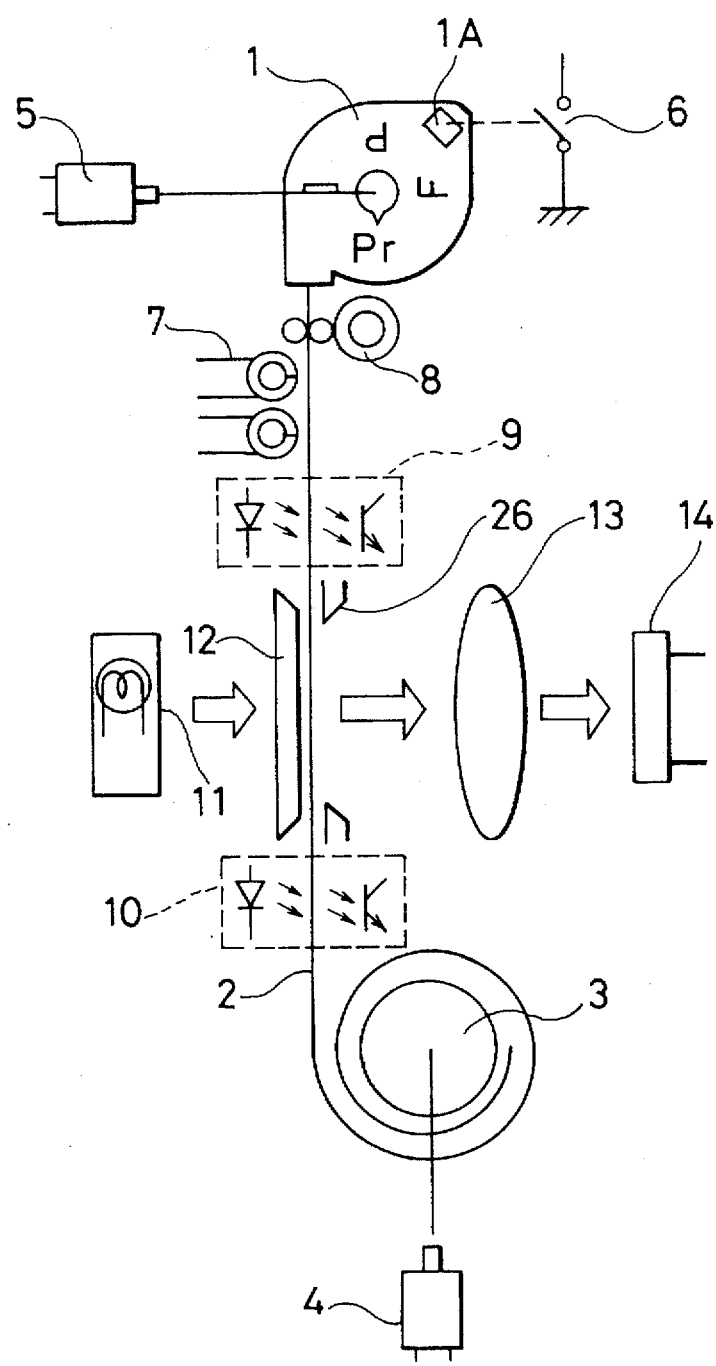
FIG. 1A shows the structure of the film image processing apparatus in an embodiment according to the present invention.

FIG. 1A is a structural diagram showing the essential portion of the processing apparatus according to the present invention and FIG. 1B is a block diagram showing its control system.

Reference number 1 indicates a film cartridge already loaded in the image processing apparatus, which is internally provided with a spool shaft around which film 2 is wound. The film 2 is provided with a magnetic recording area below each photographic frame where photographic information related to that frame is recorded. The film used for photographing by a camera (not shown) is taken to, for instance, a laboratory, developed and then returned to the user re-installed in the cartridge. On the upper surface of the cartridge 1, an indicator mechanism 1A is provided that, by its position, indicates whether or not the film inside has been developed.

Reference number 3 indicates a wind-up spool for winding up the film that has been drawn out from the cartridge 1, reference number 4 indicates a wind-up motor that causes the wind-up spool to rotate and reference number 5 indicates a delivery/rewind motor, that delivers the film from the cartridge and rewinds the film into the cartridge by causing the spool shaft in the cartridge 1 to rotate. These motors 4 and 5 are connected to a number 6 indicates a state detection switch that is turned on/off in correspondence to the position of the indicator mechanism 1A of the cartridge 1, and it is turned on when the indicator mechanism 1A indicates that the film has been developed and is turned off when it indicates that the film has not yet been developed. The on/off state of this state detection switch is input to the CPU 22.

Reference number 7 indicates a magnetic head that reads information magnetically recorded in magnetic recording areas provided on the film 2 and magnetically records information in the recording area. A signal read by the magnetic head 7 is amplified and decoded in a magnetic read circuit 20 and is then input to the CPU 22. When magnetic recording is performed, the CPU 22 drives the magnetic head 7 via a magnetic record circuit 21. Reference number 8 indicates a film encoder that measures the speed at which the film moves and the distance over which the film moves as film feed is performed. Reference numbers 9 and 10 indicate photointerrupters that detect perforations formed in the film. The detection outputs from the film encoder 8 and the photointerrupters 9 and 10 are input to the CPU 22. Note that the film 2 is provided with one perforation at each end of the exposure area of each photographic frame.

Figure 3A:
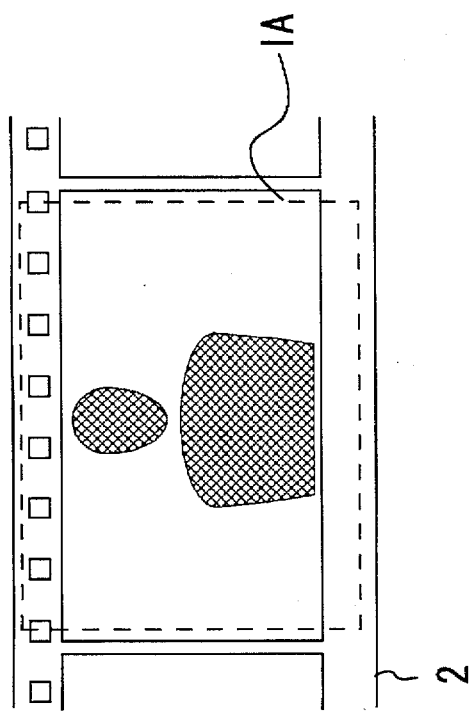
FIGS. 3A-3D show screen image display examples.

Reference number 11 indicates an illuminating light source for illuminating the film. Reference number 12 is a diffusion plate that diffuses the light from the illuminating light source converting it into a milky white color and also functions as a pressing plate for regulating the position of the film in the direction of the film thickness. Of the light that has passed through the diffusion plate 12 and the film 2, only the light that has also passed through an opening 26 is transmitted through an image pickup lens 13 to form image on a CCD 14. With this, the photographic image formed on the film 2 is projected onto the CCD 14. The area IA in FIG. 3A is the area of the film that is projected onto the CCD (hereafter referred to as the image area). The aspect ratio of the image area IA is the same as the aspect ratio of the opening 26 at 3:4.

Figure 2:
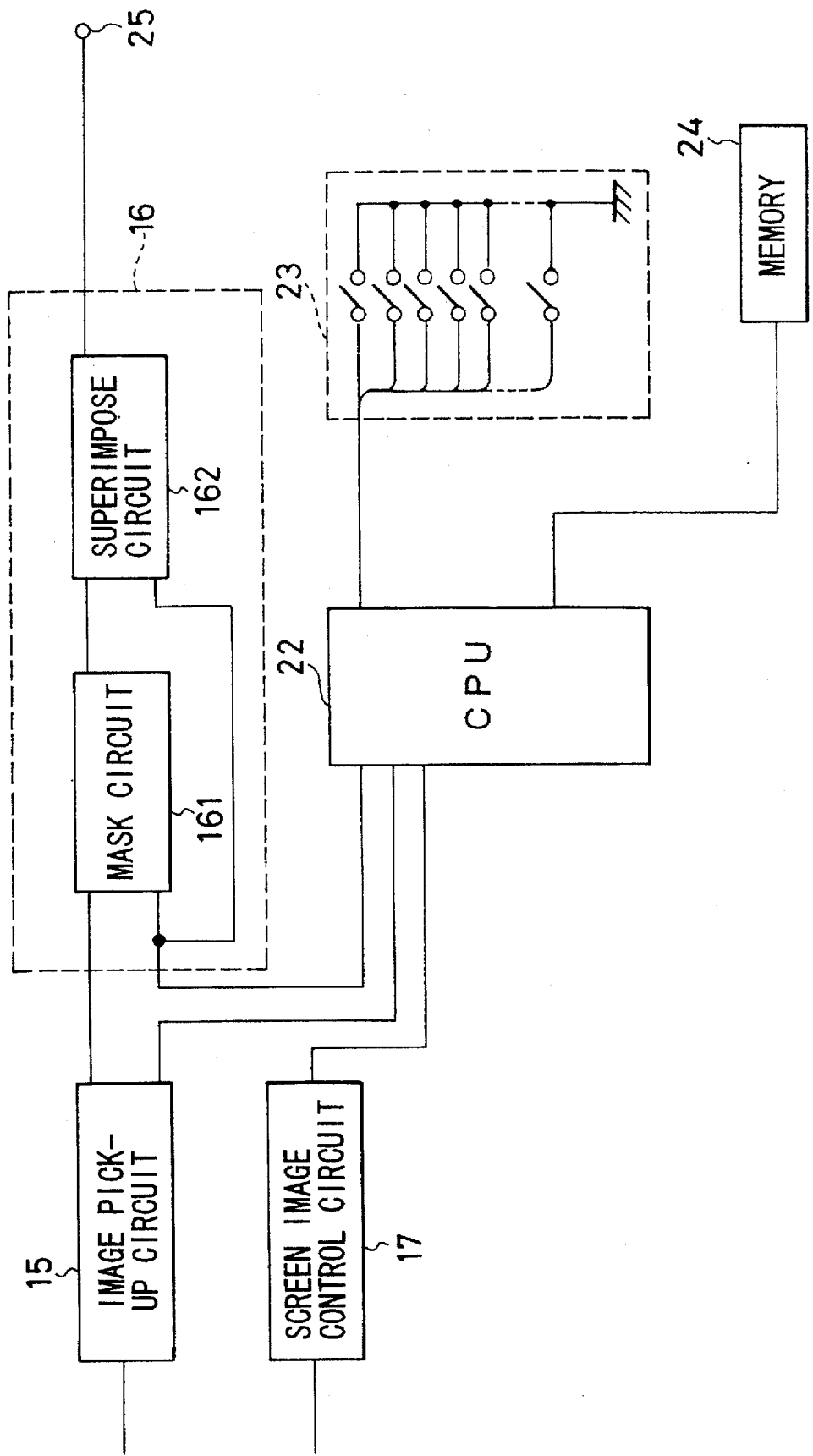
FIG. 2 shows details of a portion of FIG. 1B.

Reference number 15 indicates an image pickup circuit that converts a signal read by the CCD 14 to a video signal and reference number 16 indicates a screen image control circuit that processes the video signal in order to create a desired display screen image signal. As shown in FIG. 2, the screen image control circuit-16 is provided with a mask circuit 161 that masks a portion of a video signal input from the image pickup circuit 15 and a superimpose circuit 162 that adds a character string or the like to the masked video signal output from the mask circuit 161. The position and the width of the portion that is masked at the mask circuit 161 vary depending upon the television screen size and the print size as explained later and the masked portion of the screen image is displayed as a black band on the screen 110 of the television set 100.

Figure 3D:
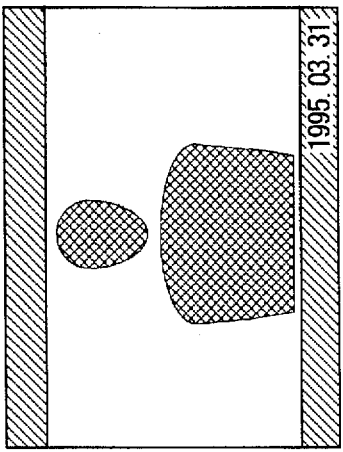
Figure 3C:
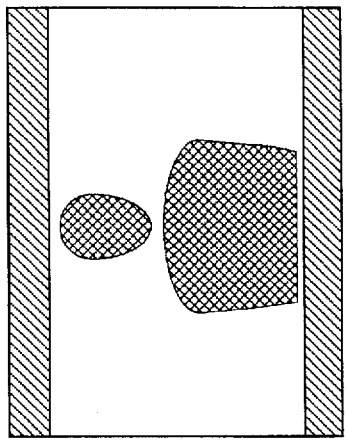
Figure 3B:
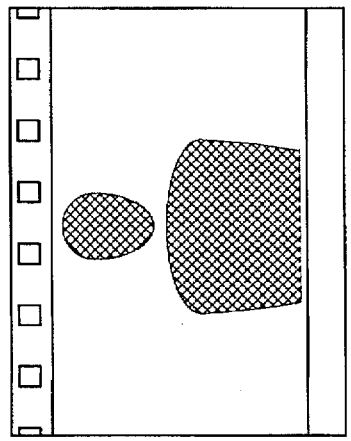
Figure 4:
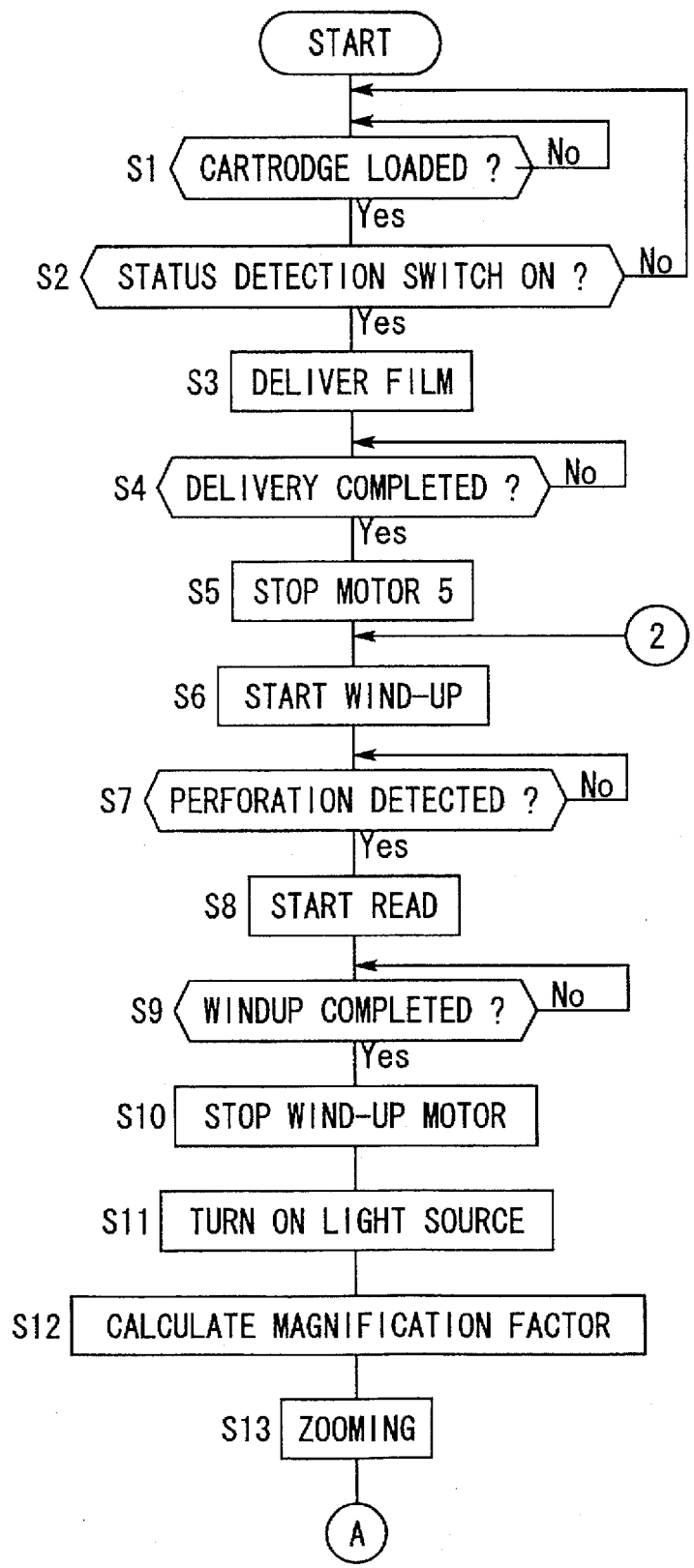
FIGS. 4-8 are a flowchart illustrating the operation of the film image processing apparatus.
Figure 5:
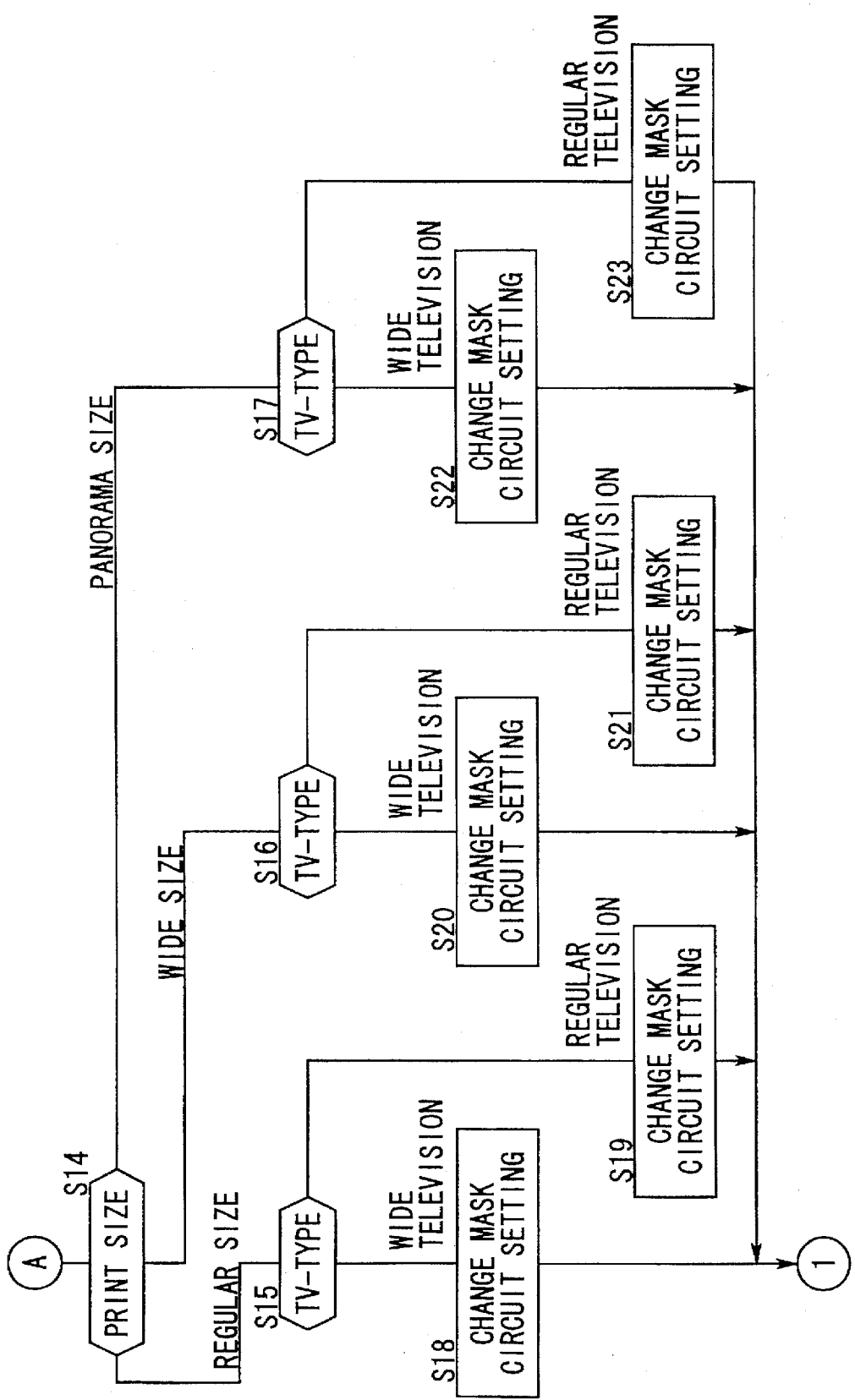
Figure 6:
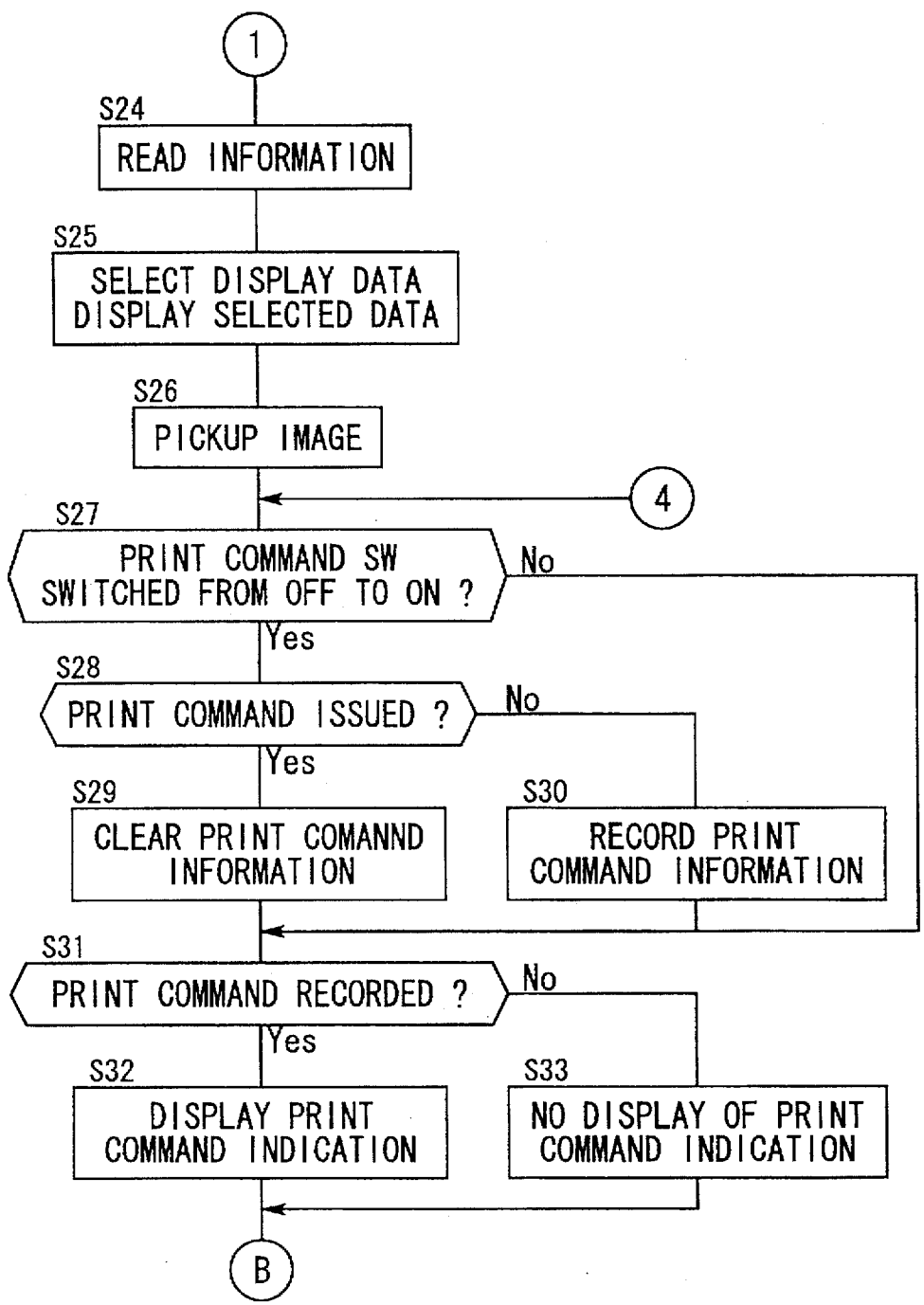
Figure 7:
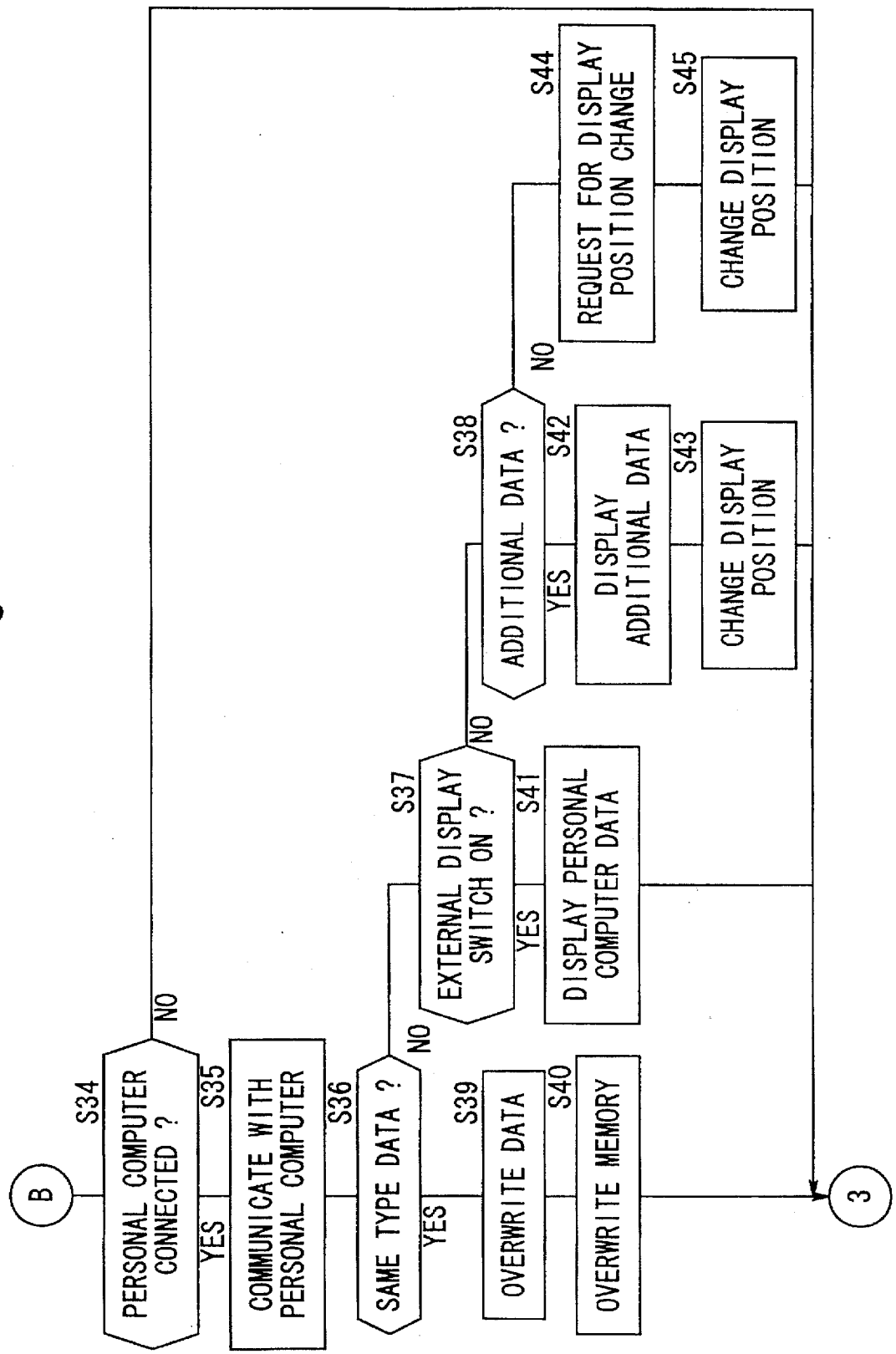
Figure 8:
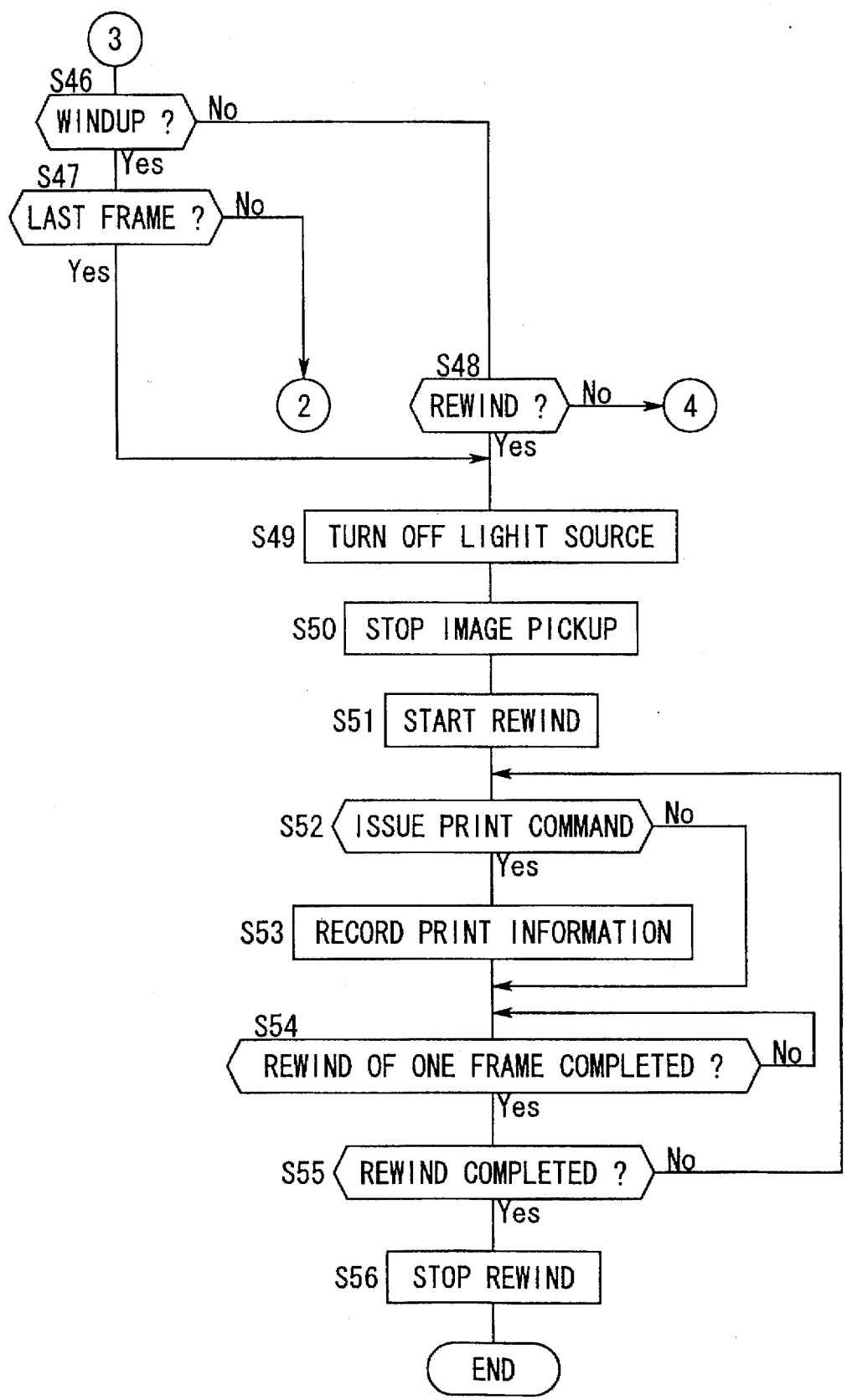

A display screen image signal generated at the screen image control circuit 16 is transferred to a television set 100 (or a video deck) via a video signal output terminal 25. FIGS. 3B–3D all show screen images of video signals, with FIG. 3B showing a video signal output from the image pickup 15. FIG. 3C showing a video signal that has been masked at the mask circuit 161 and FIG. 3D showing a video signal to which a character string has been added by the superimpose circuit 162.

Reference number 17 indicates an AF/zoom control circuit that performs focusing adjustment and zooming by driving the image pickup lens 13 in the direction of its optical axis. Reference number 19 indicates an illumination control circuit that performs on/off control of the illuminating light source. Both circuits are operated by commands issued from the CPU 22. In addition, an operating switch group 23 (also shown in FIG. 2) constituted of a plurality of operating switches, a memory 24, for storing information read by the magnetic head 7 and an interface circuit 27 for connecting the image processing apparatus to a personal computer 28 are connected to the CPU 22. The personal computer 28 is used to enter information to be displayed along with the screen images on a television screen 110 (information that is not recorded in the magnetic recording areas of the film).

The operating switch group 23 includes a TV-type switch that sets the type of television to which the image processing apparatus is connected, a print command switch for issuing a print command in relation to a photographic frame, an external display switch that issues a command for display of information sent from the personal computer 28, a wind-up switch for winding up the film 2 by one frame, a rewind switch for winding back the film, an all data display switch for displaying all the information related to each photographic frame, a screen-out display switch for displaying information while ensuring that the information is not superimposed on the screen image of the photographic image, an extra display switch for implementing extra display that is to the detailed later and a character size switch that sets the size of the display characters. In this embodiment, selection can be made with the TV-type switch between a regular television with an aspect ratio of 3:4 and a wide-screen television with an aspect ratio of 9:16. In addition, the CPU 22 sets the first display mode for displaying only date information when the all data display switch mentioned above is turned off and sets the second display mode for displaying all the information when the all data display switch is turned on. Next, the procedure of the control performed by the CPU 22 is explained in reference to the flow chart in FIGS. 4–8.

The program shown in FIGS. 4–8 is activated when power is turned on in a state in which the video signal output terminal 25 is connected to a video signal input terminal of a television set 100 by a cable. In step S1, a decision is made as to whether or not the film cartridge 1 is loaded in the image processing apparatus by monitoring a cartridge detection switch (not shown), and if the cartridge 1 is loaded, the operation proceeds to step S2. In step S2, a decision is made as to whether the state detection switch 6 is on or off, and if it is off, i.e., if the film in the cartridge 1 has not been developed, the operation returns to step S1, whereas if it is on, i.e., if the film has been developed, the operation proceeds to step S3.

In step S3, the delivery/rewind motor 5 is rotated in the direction of film delivery via the motor control circuit 18 to deliver the film from the cartridge 1. The delivered film 2 is guided to the wind-up spool 3 through the portion immediately rearward of the opening 26, and with the movement of the film at this time, the film encoder 8 rotates. In step S4, the delivery quantity of the film is detected based upon the output from the film encoder 8 and a decision is made as to whether or not the front end of the film 2 has reached the wind-up spool 3. If an affirmative decision is made in step S4, the operation proceeds to step S5, in which the motor control circuit 18 stops the delivery/rewind motor 5.

In step S6, the wind-up motor 4 is driven via the motor control circuit 4 so that a specific photographic frame is positioned at the opening 26 and the film 2 is wound up by rotating the wind-up spool 3 in the direction of wind up. In step S7, the operation waits for one of the photointerrupters, i.e., the photointerrupter 9, to detect a perforation of the film 2 and when it is detected, the operation proceeds to step S8. The photographic frame to be positioned reaches the opening 6 immediately after the photointerrupter 9 detects the perforation.

In step S8, the magnetic head 7 is driven via the magnetic read circuit 20, and read of the magnetic information related to the photographic frame from the magnetic recording area of the photographic frame to be positioned starts. This magnetic information has been recorded by a camera (not shown) during photographing and includes, for instance, the angle of field of photographing, the aspect ratio for printing (print size), the photographing date, the photographing time, the film sensitivity, the shutter speed, the aperture value, the focal length of the taking lens and the camera type. The magnetic read circuit 20 reads the magnetic signal from the magnetic head 7, converts it to magnetic information and inputs it to the CPU 22. The magnetic information thus input is stored in the memory 24. Note that the aspect ratio of the photographic image formed on the film is constant regardless of the print size.

In step S9, the operation waits for the other photointerrupter 10 to detect a perforation of the film 2 and when the perforation is detected, it is decided that wind up has been completed and then the magnetic read circuit 20 is stopped before the operation proceeds to step S10. In step S10, the wind-up motor 4 is stopped by the motor control circuit 18. The photographic frame to be positioned must be positioned at the opening 26 when the photointerrupter 10 detects the perforation.

In step S11, the illuminating light source 11 is lit by the illumination control circuit 19. The illuminating light of the light source 11 illuminates the film 2 from the rear via the diffusion plate 12 and the image of the light that has been transmitted through the film 2 is formed on the CCD 14 via the image pickup lens 13. In step S12, the initial value of the focal length of the image pickup lens 13 is calculated. In step S13, the image pickup lens 13 is zoom driven by operating the AF/zoom control circuit 17 and the focal length is set at the initial value. For instance, when the image pickup lens 13 is zoomed to an enlarge position, the image pickup lens 13 is zoomed down so that the entire screen image defined by the opening 26 is displayed on the television screen 110.

In step S14, a decision is made as to the aspect ratio (print size) at the time of printing based upon the magnetic information read in step S8. There are three print sizes, i.e., the regular size with an aspect ratio of 2:3, the wide size with an aspect ratio of 9:16 and the panorama size with an aspect ratio of 1:3. If the print size for the positioned photographic frame is the regular size, the operation proceeds to step S15, if the print size is the wide size, the operation proceeds to step S16 and if the print size is the panorama size, the operation proceeds to step S17. In steps S15–S17, a decision is made as to whether the TV-type switch, which is one of the switches constituting the operating switch group 23, is set for wide-screen television or regular television. In steps S18–S23, in correspondence to the results of the decision making performed in steps S14–S17, the setting at the mask circuit 161 is changed in the following manner so that a screen image with a specific aspect ratio can be formed.

(1) When the print size is regular and the TV-type is wide

Figure 9C:
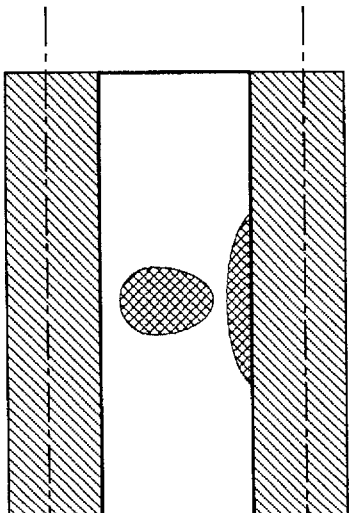
FIGS. 9A-9F show display states when a wide television is used, and illustrate the aspect ratios of screen images displayed on TV screens.
Figure 9B:
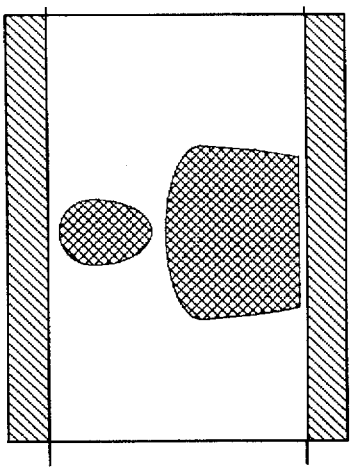
Figure 9A:
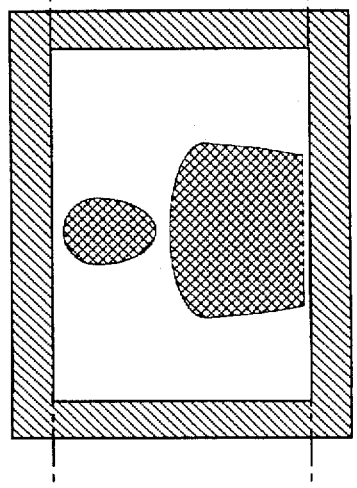
Figure 9F:
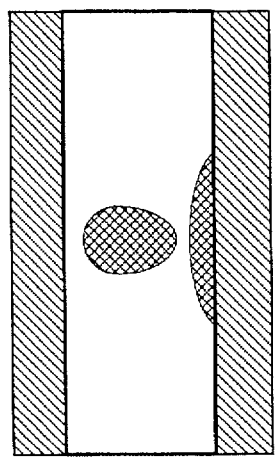
Figure 9E:
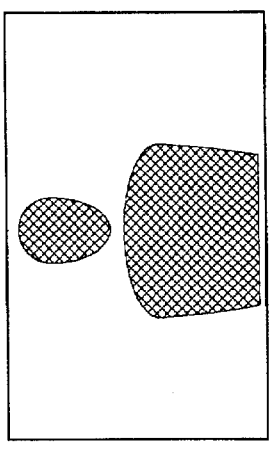
Figure 9D:
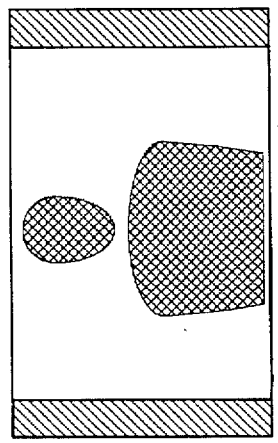

In this case, the operation proceeds to step S18, in which the upper and lower portions of the screen image, with an aspect ratio of 3:4 (the screen image in the image area IA) that has been input from the image pickup circuit 13, are masked to obtain a screen image with an aspect ratio of 9:16. Then, the screen image that has been masked to achieve an aspect ratio of 9:16 is further masked in the left and right directions to achieve an aspect ratio of 2:3, which is the ratio for printing in the regular size. As a result, a screen image that is masked in both up and down and left and right directions (see FIG. 9A) is obtained. Since a wide-screen television displays a television screen image with an aspect ratio of 3:4, by cutting off the top and bottom, the screen image with the left and right portions masked as shown in FIG. 9D is displayed on the television screen 110.

(2) When the print size is regular and the TV-type is regular

Figure 10A:
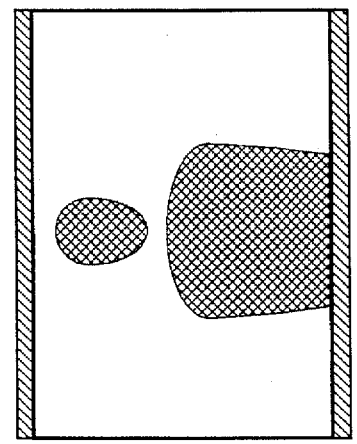
FIGS. 10A-10C show display states when a regular television is used, and illustrate the aspect ratios of screen images displayed on a TV screen.

In this case the operation proceeds to step S19, in which the upper and lower portions of the screen image input from the image pickup circuit 15 are masked to achieve a screen image with an aspect ratio of 2:3. A screen image with the upper and lower portions masked as shown in FIG. 10A is displayed on a regular television screen 110.

(3) When the print size is wide and the TV-type is wide

In this case the operation proceeds to step S20, in which the upper and lower portions of the screen image input from the image pickup circuit 15 are masked to achieve a screen image with an aspect ratio of 9:16. As a result, a screen image with the upper and lower portions masked, as shown in FIG. 9B, is obtained. The screen image displayed on a wide-screen television is as shown in FIG. 9E.

(4) When the print size is wide and the TV-type is regular

Figure 10B:
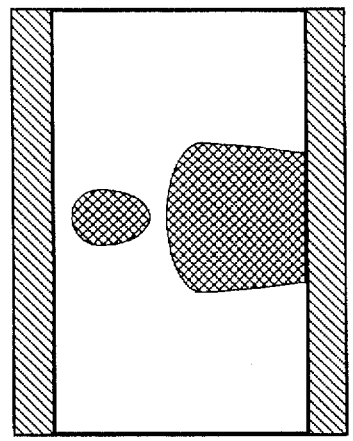

In this case, the operation proceeds to step S21, in which the upper and lower portions of the screen image input from the image pickup circuit 15 are masked to achieve a screen image with an aspect ratio of 9:16. A screen image with its upper and lower portions masked, as shown in FIG. 10B, is displayed on the screen of a regular television.

(5) When the print size is panorama, and the TV-type is wide

In this case, the operation proceeds to step S22, in which the upper and lower portions of the screen image input from the image pickup circuit 15 are masked to achieve a screen image with an aspect ratio of 1:3. As a result, a screen image with its upper and lower portions masked, as shown in FIG. 9C, is obtained. The screen image displayed on a wide-screen television is as shown in FIG. 9F.

(6) When the print size is panorama and the TV-type is regular

Figure 10C:
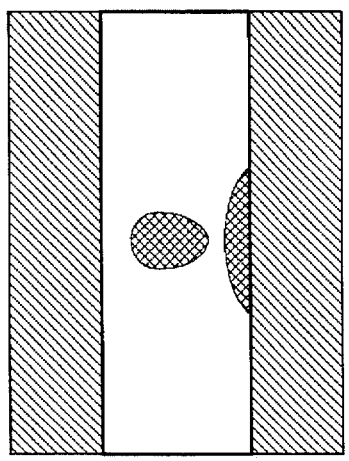

In this case, the operation proceeds to step S23, in which the upper and lower portions of the screen image input from the image pickup circuit 15 are masked to achieve a screen image with an aspect ratio of 1:3. A screen image with its upper and lower portions masked, as shown in FIG. 10C, is displayed on a regular television screen.

Note that through the processing in (1)–(6), only the setting of the mask circuit 161 is changed and, at this point, a screen image signal has not yet been input to the mask circuit 161.

After steps S18–S23, the operation proceeds to step S24, in which the information related to the relevant photographic frame (the photographic frame positioned at the opening 26) of the magnetic information on the film that has been recorded in the memory 24 is read and then stored in another recording area of the memory 24. In step S25, information that is to be displayed as characters on the television screen 110 is selected from the information related to the relevant photographic frame stored in step S24. In other words, as explained earlier, the information related to a given photographic frame includes a plurality of types of information and since, if all the information is displayed, the screen 110 will become crowded, several types of information that are determined in the camera in advance are selected from the plurality of types of information that have been read for display on the screen. For instance, if the photographing year, month, day, hour, minute and second have been recorded, only the year, month and day may be selected and the hour, minute and second may be disregarded. In addition, since the print size has already been set through the processing performed in steps S18–S23, it is not necessary that the print size be displayed in the character information, it is not selected. The superimpose circuit 162 generates a signal for displaying the selected information as character strings on the television screen 110 in response to a command from the CPU 22 and adds the signal to the output signal from the mask circuit 161.

In step S26, the image pickup circuit 15 and the CCD 14 are started to perform the image pickup operation. An output signal from the CCD 14 is converted to a video signal at the image pickup circuit 15 and then is further converted to a display screen image signal at the screen image control circuit 16. At this time, the mask circuit 161 sets the aspect ratio of the screen image, as has been explained in reference to the processing in steps S18–S23, and a signal for displaying character strings is added by the superimpose circuit 162. The display screen image signal generated at the screen image control circuit 16 is input to a television (not shown) via the video signal output terminal 25 and is visually displayed on the television screen 110. In summary, the photographic image of the photographic frame that is currently positioned is displayed on the television screen 110 as a positive screen image and the information related to the photographic image is superimposed in the display.

In step S27, a decision is made as to the state of the print command switch, which is one of the switches constituting the operating switch group 23, and if it is decided that the print command switch has been switched from off to on, the operation proceeds to step S28. In step S28, based upon the contents of the memory 24, a decision is made as to whether or not a print command has already been issued for the relevant photographic frame (the photographic image that is currently displayed on the television screen) and if a negative decision is made, the operation proceeds to step S30. In step S30, information indicating that a print command has been issued for the relevant photographic frame is stored in the memory 24 and then the operation proceeds to step S31. If, on the other hand, an affirmative decision is made in step S28, i.e., if a print command has already been issued, the information indicating that a print command has been issued is cleared from the memory 24 in step S29 and the operation proceeds to step S31. Note that if a negative decision is made in step S27, the operation skips steps S28–S30, and moves on to step S31.

Figure 11A:
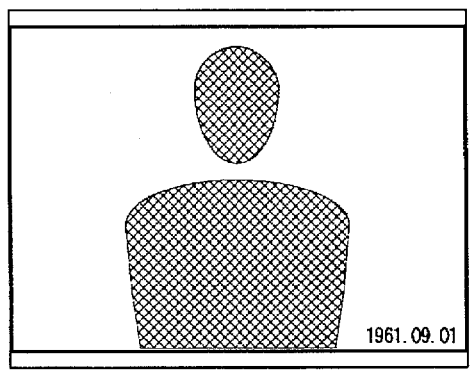
FIGS. 11A, 11B, 12A-12E illustrate the superimpose function.
Figure 11B:
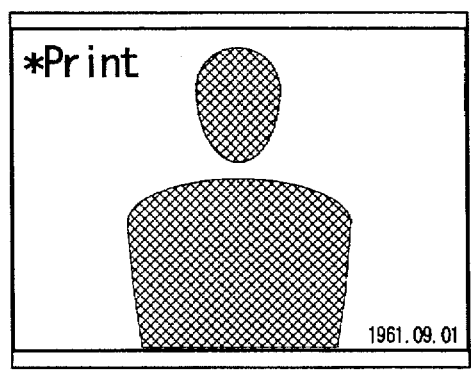

In step S31, the contents of the memory 24 are read and a decision is made as to whether or not a print command has been issued for the relevant photographic frame. If a print command has been issued, the operation proceeds to step S32, in which the superimpose circuit 162 is operated to display a print command mark on the TV screen. This print command mark may be, for instance, the characters "* Print" as shown in FIG. 11B. If, on the other hand, a print command has not been issued, the operation proceeds to step S33 to clear the print command mark from the TV screen.

In step S34, a decision is made as to whether or not the personal computer 28 is connected to the interface circuit 27, and if it is not connected, the operation proceeds to step S46, whereas, if it is connected, the operation proceeds to step S35. In step S35, communication is performed with the personal computer 28 via the interface 27 to receive data (external information) to be displayed as text on the TV screen from the personal computer 28. In step S36, a decision is made as to whether or not, among the received data, there are data of the same type as has already been read from the magnetic recording area of the film by the magnetic head 7 and stored in the memory 24. If such data of the same type are stored in memory, the operation proceeds to step S39.

Figure 12A:
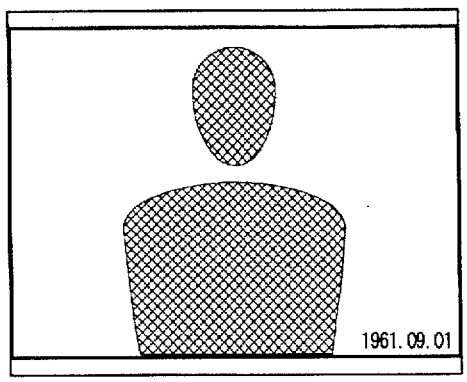
Figure 12B:
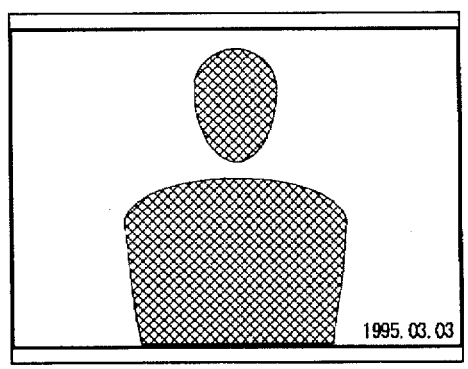

In step S39, if the data (read information) of the same type as that in the received data are being displayed on the screen, these data are overwritten with the received data. For instance, if the year, month, day data is sent from the personal computer 28 while displaying another year, month, day data as shown in FIG. 12A, the display data are changed to the year, month, day data sent from the personal computer, as shown in FIG. 12B. In step S40, among the data stored in the memory, the data of the same type as the received data are overwritten with the received data.

Figure 12C:
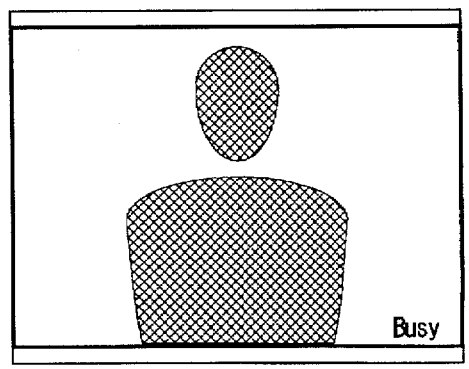

If, on the other hand, it is decided in step S36 that there are no data of the same type, the operation proceeds to step S37, in which a decision is made as to whether or not the external display switch, which is one of the switches constituting the operating switch group 23, is on. If it is on, the operation proceeds to step S41, in which the currently displayed data are cleared and the data received from the personal computer 28 are displayed in its place. For instance, FIG. 12A shows an example of display when there is no communication with the personal computer and FIG. 12C shows an example of display when there is communication with the personal computer and the external display switch has been turned on.

Figure 12D:
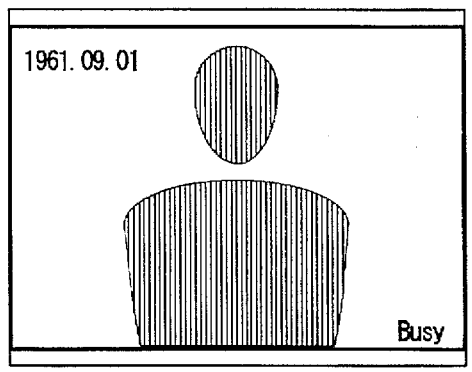

If it is decided in step S37 that the external display switch is off, the operation proceeds to step S38, in which a decision is made as to whether or not data that should be additionally displayed have been input from the personal computer 28. If there are any data for additional display, the operation proceeds to step S42, in which the data from the personal computer 28 are additionally set as display data. In step S43, the display position is changed and the data that have been additionally set are displayed. For instance, FIG. 12A shows an example of display when there is no communication with the personal computer and FIG. 12D shows an example of display when there is communication with the personal computer and there are additional data. The text data that are displayed at the lower right of the screen in FIG. 12A are moved to the upper left and the additional data from the personal computer are displayed at the lower right.

Figure 12E:
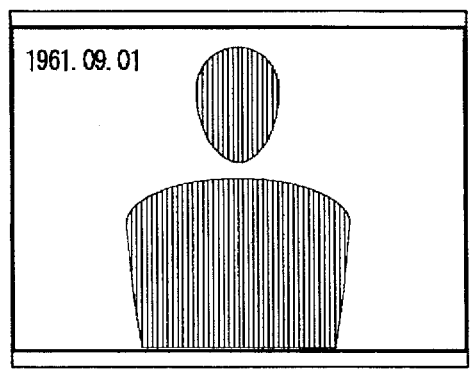

If it is decided in step S38 that there are no additional data, the operation proceeds to step S44 to set a change in the display position. In step S45, the display position is changed. For instance, FIG. 12A shows an example of display when there is no communication with the personal computer and FIG. 12E shows an example of display when there is communication with the personal computer but there are no additional data. The text data in FIG. 12A are moved upward.

After step S40, S41, S43, S45, the operation proceeds to step S46, in which a decision is made as to whether or not the windup switch, which is one of the switches constituting the operating switch group 23, is on. If it is off, the operation proceeds to step S48, in which a decision is made as to whether or not the rewind switch, which is one of the switches constituting the operating switch group 23, is on. If the rewind switch is off, the operation returns to step S27 and the processing described earlier is repeated. When the windup switch is turned on, it is decided that a command for change of the photographic image to be displayed has been issued and the operation proceeds to step S47, in which a decision is made as to whether or not the currently positioned photographic frame is the last frame. If it is not the last frame, the operation returns to step S6. When the first display mode is set, any information that has been displayed superimposed on the screen image is cleared. When the currently positioned frame is determined to be the last frame, or when the rewind switch is determined to be on, the operation proceeds to step S49.

In step S49, the illuminating light source 51 is turned off via the illumination control circuit 19. In step S50, the image pickup circuit 15 is stopped, to end the image pickup operation. In step S51, the rewind motor 5 is rotated in the direction of rewind via the motor control circuit 18 to start rewind of the film 2.

In step S52, the contents of the memory 24 are read out and a decision is made as to whether or not a print command has been issued (whether or not there is a data change) for the relevant photographic frame (the frame currently being rewound). If the print command has been issued, the operation proceeds to step S53, in which the magnetic head 7 is driven via the magnetic record circuit 21 to record print information in the magnetic recording area corresponding to this photographic frame. Then, the operation proceeds to step S54.

If it is decided in step S52 that a print command has not been issued, the operation skips step S53 and proceeds to step S54. In step S54, the operation waits for the rewind of one frame to be completed and when it is completed, the drive of the magnetic head 7 is stopped before the operation proceeds to step S55. In step S55, the output from the film encoder 8 is detected to make a decision as to whether or not the rewind of all the frames has been completed. If the film encoder is still rotating, it is decided that rewind has not been completed yet and the operation returns to step S52 to repeat the processing described above. If the film encoder 8 is not rotating, then it is decided that rewind is completed and the operation proceeds to step S56 to stop the rotation of the rewind motor 5 via the motor control circuit 18. After this, the processing is ended.

As has been explained, in this embodiment, by operating the print command switch, a print command can be issued or canceled for the photographic image on the film that is currently being displayed on the TV screen. Whether or not a print command for this particular photographic image has been issued is stored in the memory 24 and for a photographic image (photographic frame) for which a print command has been issued, print command information is recorded in the magnetic recording area of the corresponding photographic frame during film rewind. As a result, the user can decide whether or not to print an image while viewing the image displayed on the monitor screen and he can issue a print command through a simple operation. In particular, since the print command information is not recorded immediately through the operation of the print command switch but rather the fact that a print command has been issued is first stored in the memory 24 and the print command information is recorded all together during the subsequent rewind, screen images do not move an undesirable manner during viewing. In addition, since a print command can be canceled while the print command information has still not been recorded, no print command information is recorded for frames for which prints are not required.

Moreover, since, at least, either the read information read from the recording area of the film or the external information input from the personal computer 28 is displayed on the monitor screen together with the screen image of the photographic image, it is possible to display various types of text information to enhance the enjoyment of screen image viewing. Especially since the read information is displayed if no external information has been input and external information is given priority for display over read information when there is external information that has been input, it is possible to display the information that the user wishes to display. In addition, since the external information is given priority for display, if the read information and the external information both contain information in the same category, it is possible to change information in a given category freely and, unlike in the situation in which the read information and the external information are displayed together, the user does not become confused. As either the read information or the external information can be selected and the information that has been selected is displayed, it is possible to view a plurality of types of information without crowding the screen.

Furthermore, since both the read information and the external information can be displayed on the monitor screen together as necessary, a plurality of types of information can be viewed simultaneously. In particular, if no external information has been input for display, the read information is displayed in a first display area of the monitor screen (lower right area of the screen in this embodiment), and when there is external information input that should be displayed, the read information currently displayed in the first display area is moved to a second display area on the monitor screen (the upper left area of the screen in this embodiment) and the external information that has been input is displayed in the first display area. Thus, it is possible to immediately distinguish between the read information and the external information among the information being displayed.

Note that while an example in which the apparatus according to present invention is connected to a separate television to display screen images on the television screen is explained above, the apparatus according to the present invention may itself be provided with a built-in monitor device. In addition, commands for operations such as film windup and film rewind in this apparatus are issued from switches provided on the apparatus, these commands may be issued by the personal computer 28. Furthermore, the external device is not limited to the personal computer 28.

We claim:

1. A film image processing apparatus comprising:
   an image pickup device that picks up a photographic image formed on developed film;
   a screen image signal output device electrically connected to said image pickup device, which outputs a screen image signal to display said image that has been picked up as a screen image on a monitor screen;
   a reading device that reads information related to said photographic image from an information recording area provided on said film;
   an input device that inputs external information from an external device connected to said film image processing apparatus;
   a display device that outputs a display signal to display text information related to said photographic image on said monitor screen; and
   a control device electrically connected to said reading device, said input device and said display device, which controls said display device so that, at least, either read information read by said reading device or said external information input from said external device is displayed on said monitor screen as text information together with said screen image of said photographic image.

2. A film image processing apparatus according to claim 1, wherein:
   said control device controls said display device so that when said external information has not been input, said read information is displayed and when said external information has been input, said external information is displayed instead of said read information.

3. A film image processing apparatus according to claim 2, wherein:
   said control device controls said display device so that said external information is displayed when said external information has been input and said read information and said external information contain information in an identical category.

4. A film image processing apparatus according to claim 1, further comprising:
   a selection device electrically connected to said reading device and said input device, which selects either said read information or said external information, wherein:
   said control device controls said display device so that information selected by said selection device is displayed on said monitor screen.

5. A film image processing apparatus according to claim 1, wherein:
   said control device controls said display device so that both said read information and said external information are simultaneously displayed on said monitor screen.

6. A film image processing apparatus according to claim 5, wherein:
   said control device controls said display device so that when no external information has been input for display, said read information is displayed in a first display area of said monitor screen and that when said external information has been input for display, said read information currently being displayed in said first display area is moved to a second display area of said monitor screen to display said external information that has been input in said first display area.

* * * * *